(12) United States Patent
Hoffman

(10) Patent No.: US 7,743,840 B2
(45) Date of Patent: Jun. 29, 2010

(54) LAWN AERATING DEVICE

(76) Inventor: Joseph E. Hoffman, 2456 Warren Pkwy., Unit B, Twinsburg, OH (US) 44087

( * ) Notice: Subject to any disclaimer, the term of this patent is extended or adjusted under 35 U.S.C. 154(b) by 15 days.

(21) Appl. No.: 12/050,474

(22) Filed: Mar. 18, 2008

(65) Prior Publication Data
US 2009/0236106 A1 Sep. 24, 2009

Related U.S. Application Data

(60) Provisional application No. 61/066,143, filed on Jan. 10, 2008.

(51) Int. Cl.
*A01B 45/02* (2006.01)
(52) U.S. Cl. .................. 172/22; 172/21; 280/32.7
(58) Field of Classification Search ............ 172/21, 172/22; 280/32.7
See application file for complete search history.

(56) References Cited

U.S. PATENT DOCUMENTS

| | | | | |
|---|---|---|---|---|
| 1,131,547 | A | * | 3/1915 | Plummer .................. 280/32.7 |
| 1,284,636 | A | * | 11/1918 | Forker .................... 172/21 |
| 1,354,495 | A | * | 10/1920 | Larsen .................... 172/423 |
| 2,223,559 | A | * | 12/1940 | Fleming ................... 111/89 |
| 3,336,042 | A | * | 8/1967 | Southall ................. 280/47.371 |
| 4,511,004 | A | | 4/1985 | Deneen |
| 4,662,456 | A | | 5/1987 | Classen |
| 5,101,910 | A | | 4/1992 | Dawson |
| 5,460,229 | A | | 10/1995 | Mattis |
| 5,586,604 | A | | 12/1996 | Postema |
| 5,769,169 | A | | 6/1998 | Miksitz |
| 5,842,707 | A | * | 12/1998 | Smith .................... 280/32.7 |
| 5,868,206 | A | | 2/1999 | Miller |
| 5,947,505 | A | | 9/1999 | Martin |
| 6,234,495 | B1 | | 5/2001 | Velke |
| 6,241,025 | B1 | | 6/2001 | Myers et al. |
| 6,415,872 | B2 | | 7/2002 | Myers et al. |
| 6,457,903 | B1 | * | 10/2002 | Dufty .................... 404/122 |
| 6,460,624 | B1 | * | 10/2002 | Dufty .................... 172/21 |
| 6,497,422 | B1 | * | 12/2002 | Bellis, Jr. .............. 280/32.7 |
| 6,637,760 | B1 | | 10/2003 | Carman |
| 6,659,190 | B2 | | 12/2003 | Jessen |
| 6,923,267 | B1 | | 8/2005 | Bentley |
| 7,100,702 | B2 | | 9/2006 | Classen |
| 7,300,061 | B1 | * | 11/2007 | Omstead ................. 280/32.7 |
| 7,341,114 | B2 | * | 3/2008 | Classen et al. ........... 172/22 |
| 7,487,842 | B2 | * | 2/2009 | Classen et al. ........... 172/22 |
| 2003/0201106 | A1 | | 10/2003 | Jessen |
| 2006/0070750 | A1 | | 4/2006 | Classen et al. |

* cited by examiner

*Primary Examiner*—Thomas B Will
*Assistant Examiner*—Joel F Mitchell
(74) *Attorney, Agent, or Firm*—Tarolli, Sundheim, Covell & Tummino LLP

(57) ABSTRACT

In accordance with the present invention an aerating device for attachment to a self-propelled lawnmower is provided. The device comprises a frame having a proximal end, a distal end, and a pair of sides extending between the proximal end and the distal end. An axle is mounted to the frame and extends between the sides of the frame. At least one tine assembly is mounted to the axle for rotation about a tine axis extending longitudinally through the axle. A platform is secured to the frame and extends outwardly from one of the proximal and distal ends of the frame for supporting an operator.

20 Claims, 9 Drawing Sheets

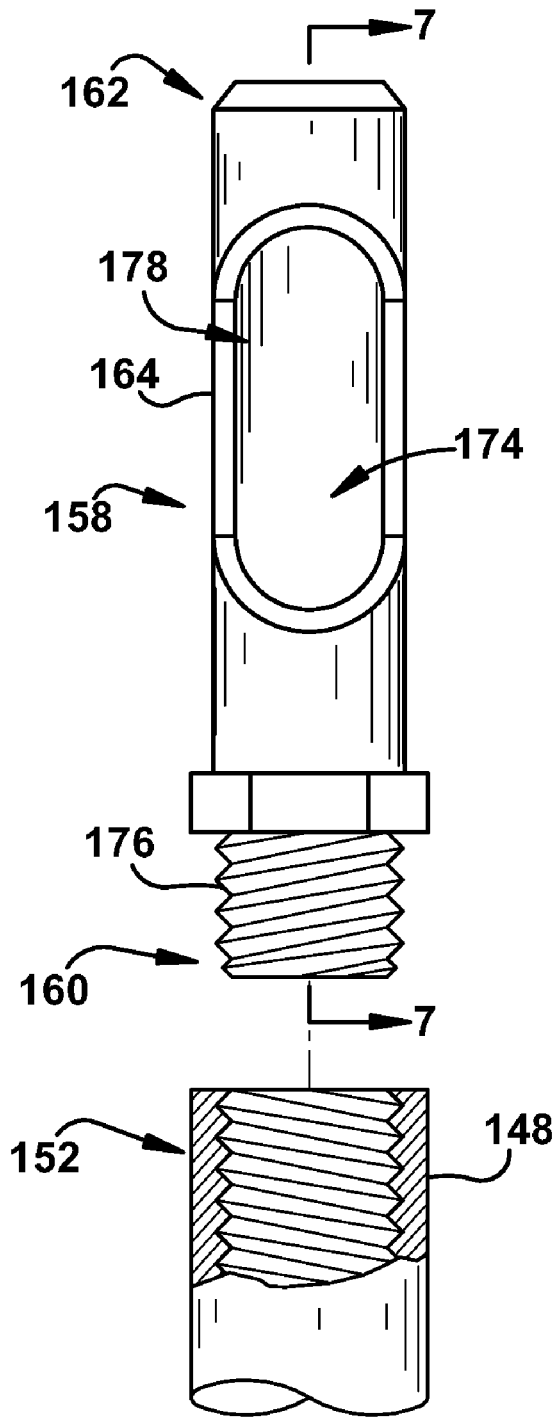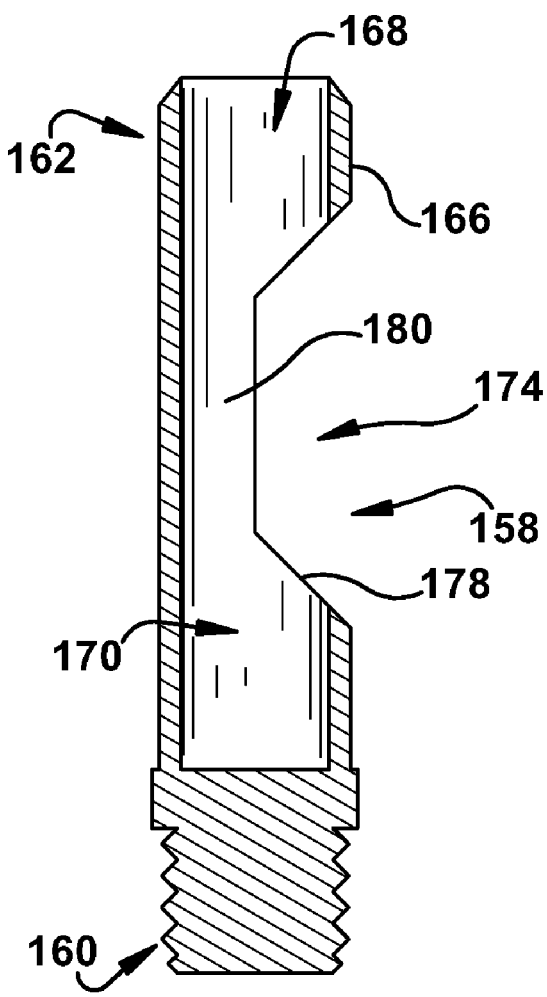
Fig. 6
Fig. 7

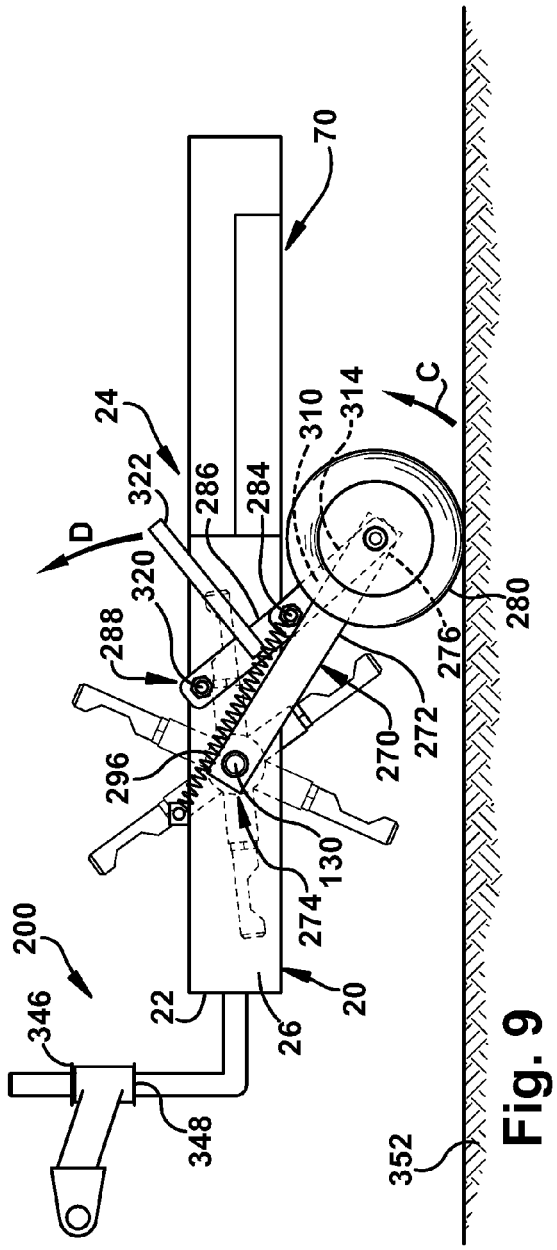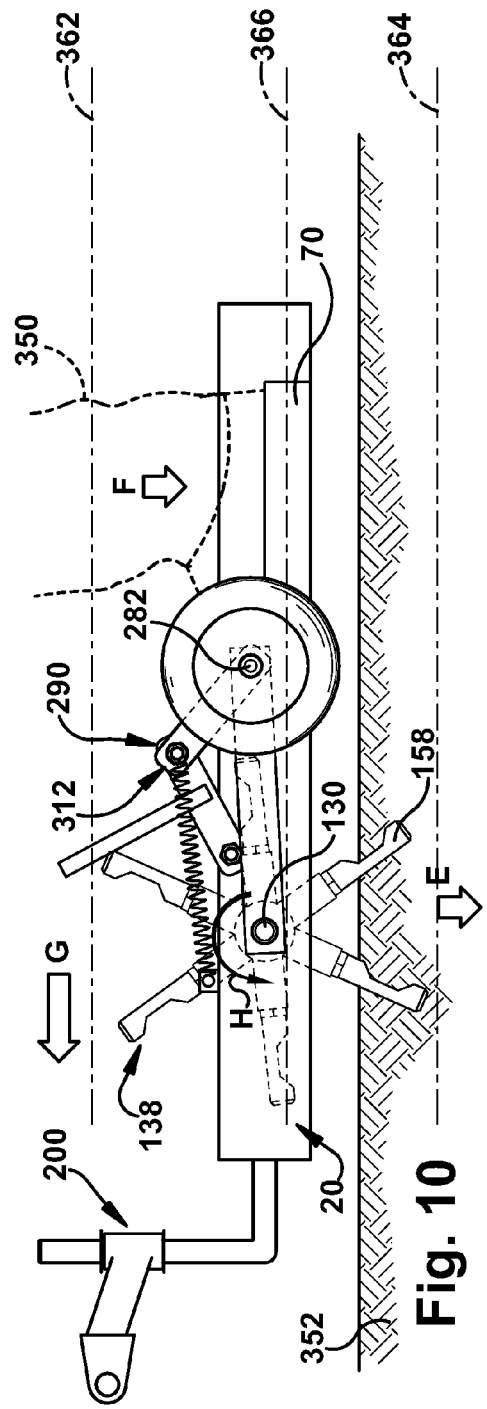

LAWN AERATING DEVICE

RELATED APPLICATIONS

This application claims the benefit of U.S. Provisional Patent Application Ser. No. 61/066,143, which was filed Jan. 10, 2008, and entitled Lawn Aerating Device, the contents of which application is hereby incorporated herein its entirety by reference.

TECHNICAL FIELD

The present invention is directed to landscaping equipment, and in particular, a lawn aerating device for use with a self-propelled lawnmower.

BACKGROUND OF THE INVENTION

Professional lawn maintenance often includes the application of dry and liquid materials including seed, fertilizer, and pesticides, as well as mechanical processes including mowing and aerating. Various vehicles have been developed and are currently in use to accomplish one or more of these common lawn care tasks.

Aeration is the process of removing thousands of plugs of thatch and soil from the lawn to improve soil aeration. This is frequently accomplished by traversing the soil with rotating tines bearing ends configured to uproot and/or overturn portions of the soil. Depending on the lawn size and soil conditions however, this process can be rather time consuming and cumbersome. It is therefore desirable to maximize both maneuverability of aerating devices as well as the ability of the tines to uproot the soil. Practically speaking, the size, weight, and cost of most commercially available aerating devices are often too much. It is therefore desirable to provide an improved aerating device.

SUMMARY OF THE INVENTION

In accordance with the present invention an aerating device for attachment to a self-propelled lawnmower is provided. The device comprises a frame having a proximal end, a distal end, and a pair of sides extending between the proximal end and the distal end. An axle is mounted to the frame and extends between the sides of the frame. At least one tine assembly is mounted to the axle for rotation about a tine axis extending longitudinally through the axle. A platform is secured to the frame and extends outwardly from one of the proximal and distal ends of the frame for supporting an operator.

In accordance with another exemplary embodiment of the present invention an aerating device for attachment to a self-propelled lawnmower is provided. The device comprises a frame having a proximal end, a distal end, and a pair of sides extending between the proximal end and the distal end. An axle is mounted to the frame and extends between the sides of the frame. At least one tine assembly is mounted to the axle for rotation about a tine axis extending longitudinally through the axle. A platform is secured to one of the proximal and distal ends of the frame for supporting an operator. The one of the proximal and distal ends of the frame is disposed between the at least one tine assembly and the platform.

In accordance with another exemplary embodiment of the present invention an aerating device for attachment to a self-propelled lawnmower is provided. The device comprises a frame having a proximal end, a distal end, and a pair of sides extending between the proximal end and the distal end. An axle is mounted to the frame and extends between the sides of the frame. At least one tine assembly is mounted to the axle for rotation about a tine axis extending longitudinally through the axle. A platform is secured to one of the proximal and distal ends of the frame for supporting an operator. The frame, the axle, and the platform lie in substantially the same plane.

BRIEF DESCRIPTION OF THE DRAWINGS

FIG. 6 is an enlarged view of the tine of FIG. 5.

FIG. 7 is a section view of the tine of FIG. 6 taken along line 6-6.

FIG. 9 is a side elevational view of the retraction device in a first condition.

FIG. 10 is a side elevational view of the retraction device of FIG. 9 in a second condition.

DETAILED DESCRIPTION

Figure 1:
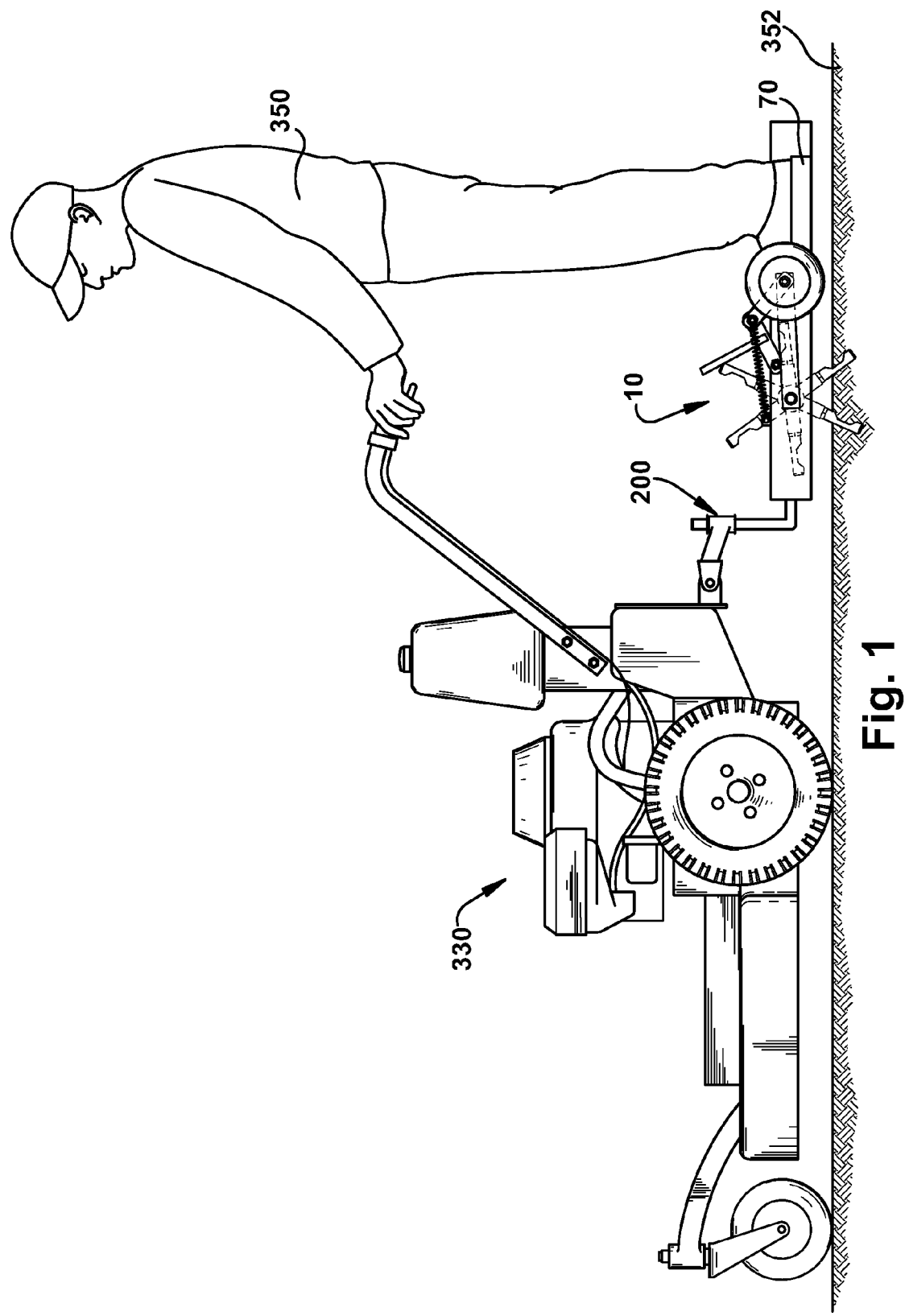
FIG. 1 is a schematic illustration of the aerating device in accordance with an exemplary embodiment of the invention.
Figure 2:
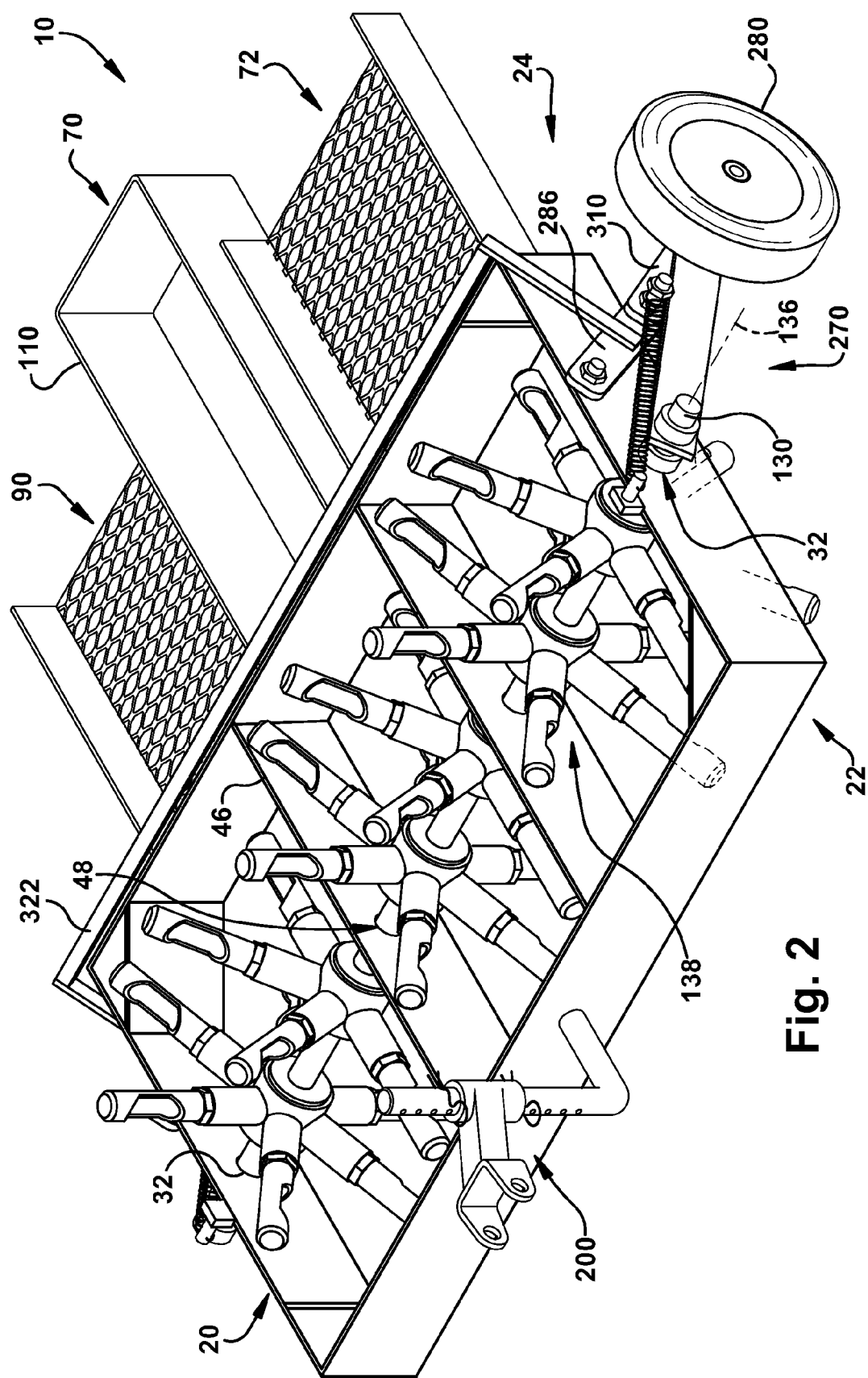
FIG. 2 is a schematic illustration of the frame of the device of FIG. 1.
Figure 3:
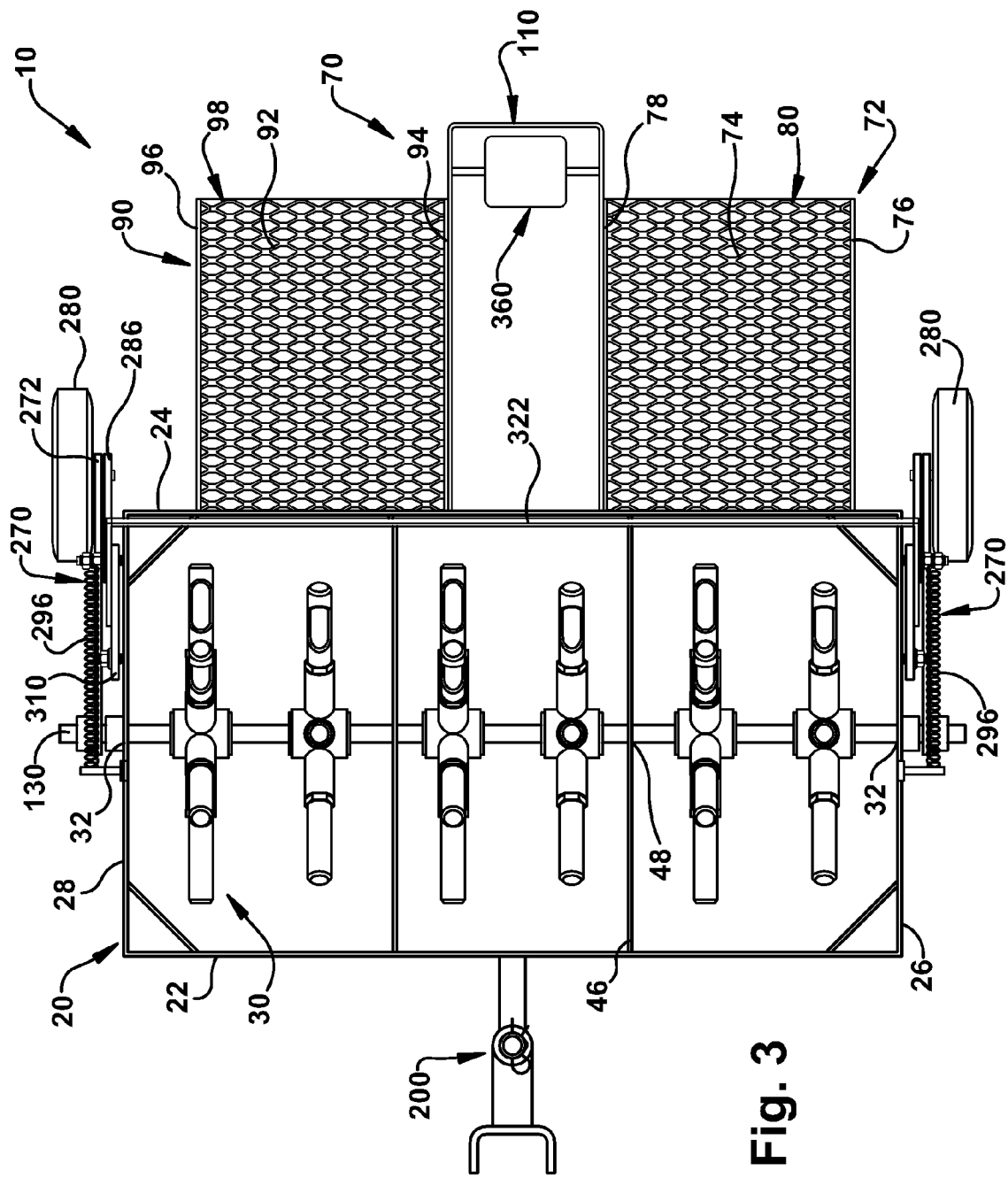
FIG. 3 is a top plan view of the frame of FIG. 2.

One example of a lawn aerating device 10 is depicted in the assembled condition in FIGS. 1-3. The device 10 includes a frame 20 that supports a platform 70 on which an operator 350 can stand during use. In the illustrated example, the frame 20 can have one or more axles 130 mounted to it. At least one tine assembly 138 is mounted on the axle 130 such that each tine assembly 138 can rotate about a central tine axis 136 which extends longitudinally through the axle 130 relative to the frame 20. A radially outer extent of the tine assembly defines a tine rotation diameter. While the examples shown and described herein relate to tine assemblies that rotate about such an axis, the device can utilize other types of tine assemblies, such as reciprocating tines, for example.

An attachment mechanism 200 is secured to an end of the frame 20 opposite the platform 70 to allow the device 10 to be mechanically coupled to a self-propelled device 330, such as a self-propelled lawnmower. The device can also include a retraction device 270 that is configured to selectively engage and disengage the tines for performing and terminating aeration. For example, the retraction device 270 can include one or more wheels 280 that are secured to both sides of the frame 20. The retraction device 270 allows the wheels 280 to extend vertically into contact with the ground when the device 10 is not in use (i.e. during transport) and retract when the device 10 is in use (i.e. during aeration). Other types and configurations of retraction devices can be utilized, as described herein, or the retraction device may be omitted from the device 10.

One example of the frame 20 is illustrated in more detail in FIGS. 2-3. The frame 20 is generally rectangular in shape, although alternative shapes, such as square, elliptical, triangular, and the like could be used. The frame 20 includes a proximal end 22, a distal end 24, and a pair of sides 26, 28 connecting the two, which together define an inner region 30. The frame 20 is made of a durable metal, such as steel, stainless steel, or aluminum. At least one reinforcement 46 may be used to strengthen the frame 20. Each reinforcement 46 runs substantially parallel to the sides 26, 28 and extends from the proximal end 22 to the distal end 24 of the frame 20. The reinforcements 46 are made of a material similar to the frame 20 and are secured to the frame 20 via fasteners, welding, or the like.

The frame 20 further includes a plurality of openings 32 that pass through the frame 20 and are aligned along an axis 50 transverse to both sides 26, 28. The openings 32 can extend through each of the sides 26, 28 as well. Any reinforcements 46 will also include a similar opening 48 along the axis 50. The openings 32 can be sized to receive a bearing (not shown) that will mate with the axle 130 and allow the axle 130 to rotate relative to the frame 20. Alternatively, the openings 32 can receive a bushing or sleeve that will mate with the axle 130 but will prevent rotation of the axle 130 relative to the frame 20. Each of the sides 26, 28 can also include an aperture 38 that extends through each side 26, 28 and into the inner region 30. The aperture 38 is generally circular in nature or otherwise configured to receive a threaded fastener 320 (see FIG. 12B).

As shown in FIG. 3, the platform 70 is attached to the distal end 24 of the frame 20 and is configured to support the weight of a human being. It is understood that the platform 70 could alternatively be attached to the proximal end 22 of the frame 20. The platform 70 can extend outwardly from the frame 20 at an elevation that resides between vertical extents of the tine rotation diameter. In one embodiment, the platform 70 may reside at a vertical elevation that is substantially coincident with (e.g., within about six inches of) the vertical elevation of the tine axle 130. As used herein, the term "vertical" refers to a direction that is substantially plumb or orthogonal relative to the ground on which the device 10 may be placed. For example, the platform 70 resides in a plane that can be considered substantially orthogonal to vertical (e.g., the platform is substantially horizontal or extends substantially parallel to a direction of travel for the device 10). The platform 70 can be attached to the frame 20 by fasteners, welding, or other attachment means. The platform 70 can be constructed of metal and is sized to accommodate the feet of the human being such that the human being can ride on the device 10 during aeration as well as transport of the device.

As one example, the platform 70 includes a first foot receiving portion 72 and an identical second foot receiving portion 90. In the example of FIGS. 2-3, the first portion 72 includes a substantially rectangular base 74 and a pair of end walls 76, 78 that extend orthogonal to the base 74. The end walls 76, 78 extend substantially parallel to the sides 26, 28 of the frame 20. The end walls 76, 78 are also substantially parallel to one another. The second portion 90 also includes a substantially rectangular base 92 and a pair of end walls 94, 96 that extend orthogonal to the base 92. The end walls 94, 96 extend substantially parallel to the sides 26, 28 of the frame 20. The sides 26, 28 are also substantially parallel to one another. The first portion 72 and the second portion 90 of the platform 70 are spaced apart such that the operator 350 can place one foot on the first portion 72 and the other foot on the second portion 90. In this configuration, the operator 350 straddles an intermediate reinforcing portion 110 and faces toward the proximal end 22 of the frame 20. The first portion 72 and second portion 90 may be separated laterally by the reinforcing portion 110 that is secured to the distal end 24 of the frame 20. The reinforcing portion 110 is substantially rectangular and is constructed of metal. Although a first portion 72 and a second portion 90 of the platform 70 are depicted, it should be understood that the platform 70 may comprise more than two portions or just a single portion. Furthermore, the platform 70 may exhibit a configuration that partially covers the feet of the operator 350 or the platform may be configured similar to a sulky for a self-propelled walk-behind lawnmower, for example.

The surface of each base 74, 92 may include a traction means 80, 98 to increase the coefficient of friction on the platform 70. This is beneficial in providing a more stable surface for the feet of the operator 350 during movement of the device 10 and/or in inclement weather conditions. The traction means 80, 98 may include a rubber mat, textured diamond plate, mesh, or the like.

An attachment mechanism 200 for securing the device 10 to the self-propelled device 330 is secured to an end of the frame 20 opposite the platform 70. The attachment mechanism 200 can be connected to the frame 20 via fasteners, welding, or the like. The attachment mechanism 200 is generally constructed of metal or other suitable rigid material.

Figure 4:
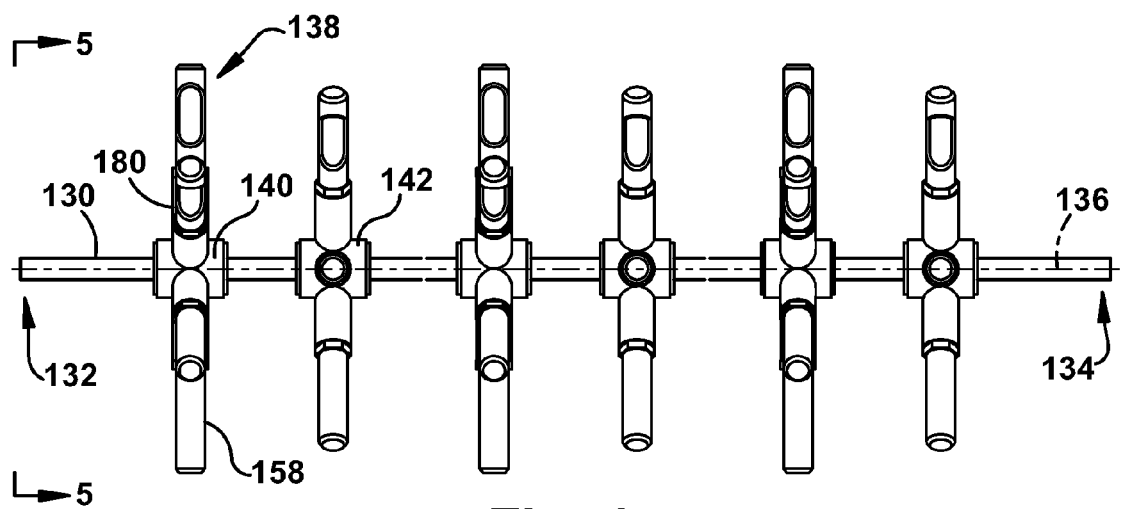
FIG. 4 is front view of the axle and tine assembly of the aerating device of FIG. 1.
Figure 5:
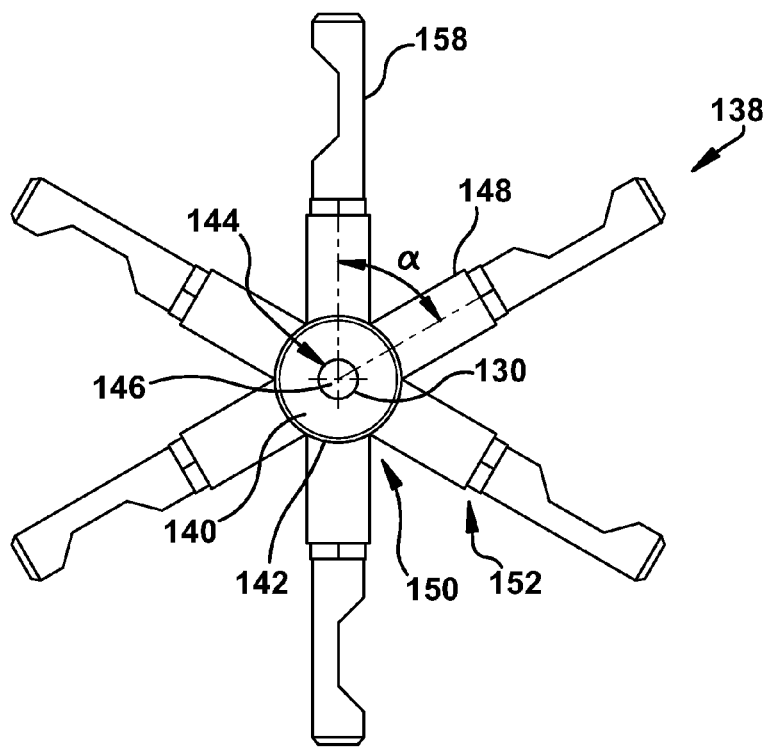
FIG. 5 is a side elevational view of the axle and tine assembly of FIG. 4.

FIGS. 4-5 illustrate one example of the axle 130 and tine assembly 138 according to an aspect of the present invention. The axle 130 has a solid, circular profile, and is symmetric about the central tine axis 136. In the illustrated example, the length of the axle 130 is such that, when it is installed within the frame 20, it extends between and beyond both sides 26, 28 of the frame 20 (see e.g. FIG. 1). At least one tine assembly 138 is mounted on the axle 130. In one embodiment, the tine assembly 138 is secured to the axle 130 and does not move relative to the axle 130. The tine assembly 138 comprises a hub 140 having an opening 144 for receiving the axle 130. The opening 144 in the hub 140 may provide an interference fit with the axle 130. Alternatively, a bushing or sleeve may be disposed within the opening 144 such that the hub 140 is secured to the axle 130. The hub 140 is generally cylindrical in nature and constructed of metal. As another alternative each tine assembly 138 can be rotatably mounted about the axle 130 via a bushing such that each tine assembly 138 rotates independently about the axle 130 while the axle 130 remains fixed relative to the frame 20.

Each of a plurality of tubular projections 148 extend radially outward from the hub 140. The projections 148 comprise a proximal end 150 and extend radially from such end to terminate at a distal end 152. The projections 148 extend outward in a plane substantially orthogonal to an outer surface 142 of the hub 140. The projections 148 can be integrally formed monolithically or welded to the hub 140 and are each adapted to hold a tine 158. Each tine 158 extends radially from each of the projections 148. While six projections 148 and tines 158 are depicted in FIG. 5, it will be understood that more or less projections 148 and tines 158 can be utilized. The projections 148 may be equally spaced apart from each other at an angle $\alpha$ about the periphery of the hub 140. Although the use of a hub 140 and projections 148 has been discussed, the tines 158 could alternatively be secured directly to the axle 130 or via other types of attachment means in other embodiments.

When all the tine assemblies 138 are disposed on the axle 130, the distance between the tine assembly 138 nearest the proximal end 132 of the axle 130 and the tine assembly 138 nearest the distal end 134 of the axle 130 may approximate or be greater than the wheel base of the self-propelled device 330 the device 10 is attached to. This distance could also be less than or equal to the device 330 wheel base.

Although the present example illustrates tines 158 extending radially from the axle 130 that are capable of rotating about and/or with the axle 130, it should be understood that other types of tine assemblies could be used. For instance, the tines 158 could be configured with the axle 130 such that each tine 158 is capable of both upward and downward movement relative to the frame 20 in a reciprocating fashion. In such an example, each tine 158 may move (or reciprocate) in a direction that is substantially orthogonal to a plane in which the frame 20 resides (not shown) for aerating ground.

One example of tine 158 is illustrated in FIGS. 6-7. The tine 158 comprises a generally cylindrical body 164 having a proximal end 160 and a distal end 162. The tine 158 is tubular in nature and includes an opening 168 at the distal end 162 leading into a passage 170. The passage 170 is defined by an inner surface 180 of the tine 158 and extends from the distal end 162 towards the proximal end 160. The passage 170 terminates prior to the proximal end 160. A second opening 174 is machined or otherwise formed laterally into the outer surface 166 of the tine 158. The opening 174 extends from the outer surface 166 to the inner surface 180. The opening 174 defines an edge 178 on the outer surface 166 of the tine 158. The edge 178 is designed to facilitate the engagement and movement of soil during use of the device 10. Although a trapezoidal profile of the edge 178 is depicted in FIG. 7, it will be understood that other profiles, such as square, triangular, elliptical, or the like, may be utilized.

The proximal end 160 of the tine 158 can include a thread engagement 176 for mating with a thread engagement 156 on the distal end 152 of the projection 148 on the hub 140. The thread engagement allows the tine 158 to be secured relative to the hub 140 as well as facilitates its replacement. Those skilled in the art will appreciate other types of attachment means (e.g., bolts, pins or the like) that can be utilized in place of such threads 176 to enable removal and replacement of the tines 158 relative to the hub 140. Alternatively, the proximal end 160 of the tine 158 can be welded or otherwise fixed to the distal end 152 of the projection 148, or a series of one or more fasteners can be used to otherwise secure the proximal end 160 of the tine 158 to the distal end 152 of the projection 148.

The profile of the tine 158 illustrated is merely one example of that which could be utilized in accordance with the present invention. Alternative profiles such as spiked, coned, or the like may be contemplated. The tine 158 may have a straight longitudinal profile (as shown in FIGS. 6-7) or a curved/arcuate longitudinal profile. For example, each tine 158 can be curved along a ground engaging distal end portion 162 with the proximal end 160 configured for attachment to the hub 140, such as by circumferential threads 176 formed along the proximal end portion or by other means of attachment to facilitate replacement of the tines in the tine assembly. The tine 158 may include additional lateral openings such as the opening 174 or none at all. The tine 158 may also be solid and therefore void of the passage 170 and the openings 168, 174.

Figure 8:
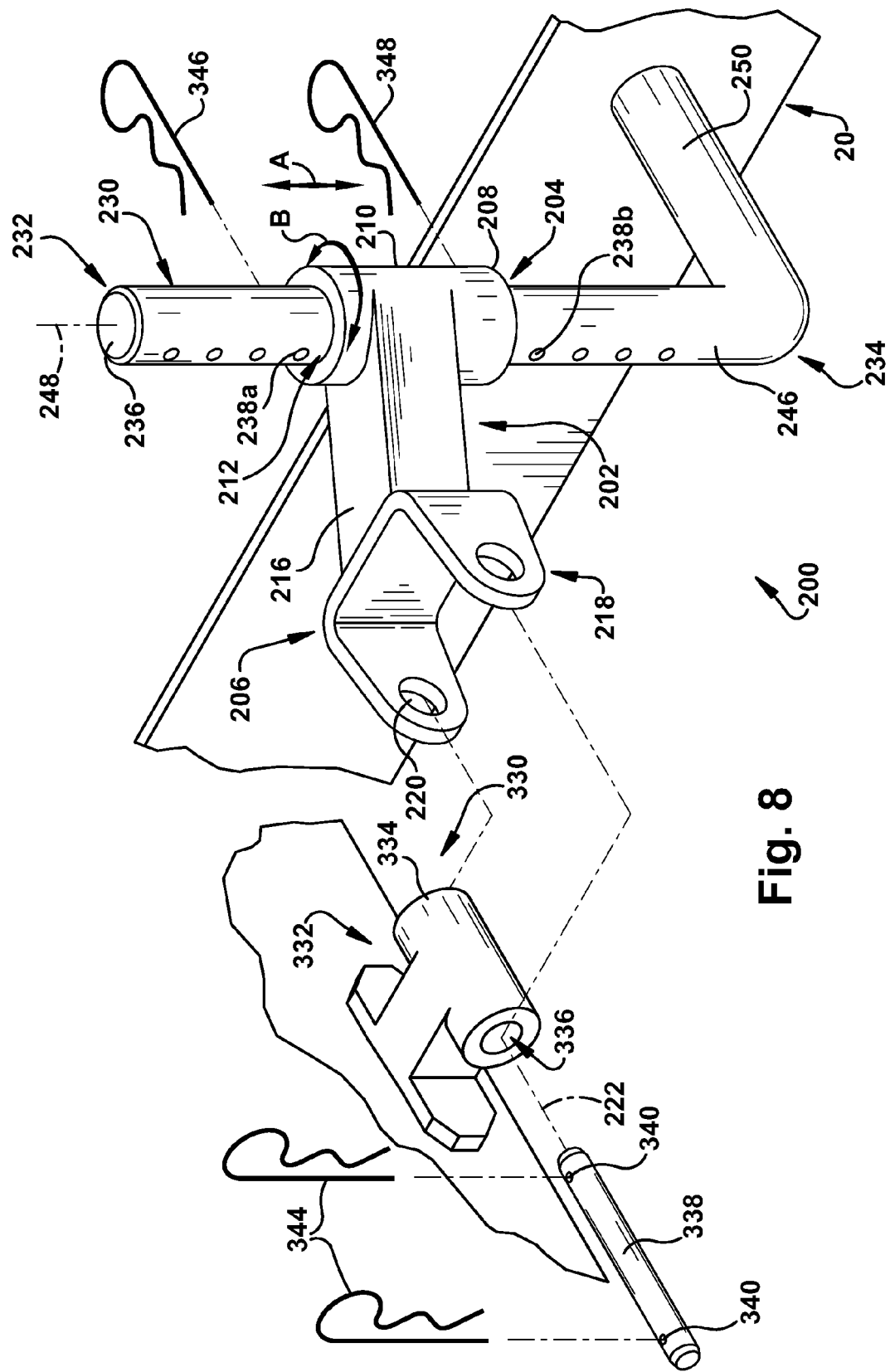
FIG. 8 is a schematic illustration of the attachment mechanism of the aerating device of FIG. 1.

The attachment mechanism 200 secured to the proximal end 22 of the frame 20 is illustrated in FIG. 8. The attachment mechanism 200 comprises a hitch 202 releasably engaged with a post 230. The hitch 202 includes a proximal end 204 and a distal end 206. The hitch 202 is constructed of a rigid material, such as metal. The hitch 202 can include a tubular member 208, an arm 216, and a forked member 218. The tubular member 208 can have a generally circular profile and includes an opening 212 extending entirely therethrough and sized to receive the post 230, which allows the hitch 202 to be slidably mounted on the post 230. The tubular member 208 further includes an outer surface 210. The arm 216 extends from the outer surface 210 of the tubular member 208 in a direction generally orthogonal to the outer surface 210. The arm 216 can be solid and generally circular in profile although other configurations can be used. The forked member 218 extends from the arm 216 at an end of the arm 216 opposite the tubular member 208. The forked member 218 is generally C-shaped and includes a pair of eyelets 220 disposed at opposite ends of the C-shaped member. The eyelets 220 are co-axial about an axis 222, and are sized to accommodate a bar or pin 338 to allow the hitch 202 to be releasably connected to the self-propelled device 330.

The post 230 on which the hitch 202 is disposed has a generally solid construction and includes a proximal end 232 and a distal end 234. The post 230 is symmetrical about a central axis 248. The post 230 includes a plurality of openings 238 longitudinally spaced along the post 230 between the proximal end 232 and the distal end 234. Each opening 238 extends entirely through the post 230 and intersects the longitudinal central axis 248 of the post 230. Each opening 238 may be equally sized to accommodate a pin, such as a cotter pin or the like. A metal bracket 250 is formed at the distal end 234 of the post 230 for securing the attachment mechanism 200 to the proximal end 22 of the frame 20 (FIGS. 2-3). Those skilled in the art will appreciate various configurations of brackets that provide means for securing the attachment mechanism to the frame 20.

By way of further example, the hitch 202 is slidably mounted on the post 230 by aligning the opening 212 in the tubular member 208 of the hitch 202 with the outer surface 246 of the post 230. The hitch 202 is then slid over the post 230. The tolerance between the opening 212 in the tubular member 208 and the outer surface 246 of the post 230 is such that the hitch 202 can easily slide along the post 230 as indicated by 'A'. Due to the engagement between the tubular member 208 and the post 230, the hitch 202 is also capable of rotating about the central axis 248 of the post 230 as indicated at 'B'. This configuration allows the forked member 218 of the hitch 202 to move in several degrees of freedom relative to the post 230, thus varying the position of the hitch 202 along the post 230. Such freedom of movement allows the hitch 202 to be manipulated in order to secure it to the device 330 and improves the turning radius of the aeration device 10 when attached to a self propelled lawn device. This movement may be about two or more axis to permit some roll, pitch, and yaw of the device 10 when pulled behind the self-propelled device 330.

In one example, the attachment mechanism 200 can be utilized to attach the aerating device 10 to the self-propelled device 330. The device 10 is placed on the ground 352 with the forked member 218 of the hitch 202 on the attachment mechanism 200 nearest the back of the device 330. The forked member 218 is adapted to releasably connect with a receiver 332 secured to the back of the device 330. The receiver 332 can be constructed of metal or other rigid material and comprises a generally tubular member 334 having an opening 336 extending entirely therethrough. The eyelets 220 on the forked member 218 are spaced apart such that the tubular member 208 of the receiver 332 fits between them. In this orientation, the opening 336 on the tubular member 334 will be co-axial with the axis 222 of the eyelets 220. A bar 338 having an opening 340 on either end is inserted into one eyelet 220 in the forked member 218, through the opening 336 in the tubular member 334, and out the other eyelet 220 in the forked member 218. A pin 344, such as a cotter pin, is disposed through each opening 340 in the bar 338 on either side of the forked member 218 to prevent the bar 338 from exiting either eyelet 220. This prevents the forked member 218 from sliding off the tubular member 334 during use, and attaches the aerating device 10 to the back of the device 330.

Aligning the eyelets 220 of the forked member 218 with the opening 336 in the tubular member 334 of the receiver 332 is facilitated by the movement between the tubular member 208 of the hitch 202 and the post 230. As discussed, the tubular member 208 is capable of sliding along the post 230 in the direction A, as well as rotating about the central axis 248 of the post 230 in the direction B. That movement allows the forked member 218 to move in several degrees of freedom to align with the receiver 332 while minimizing the need to move the entire aerating device 10 or device 330. Once the forked member 218 has been aligned with the receiver 332 a pin 346, such as a cotter pin, is inserted through the opening 238a in the post 230 directly above the tubular member 208. A pin 348 is also inserted into the opening 238b directly below the tubular member 208. This prevents the hitch 202 from longitudinally sliding relative to the post 230 during use of the aerating device 10. If desired, the pin 346 can be inserted in an opening 238 closer to the proximal end 232 of the post 230 to allow some longitudinal movement of the hitch 202 along the post 230 during operation of the device 10. Regardless, when the hitch 202 is attached to the device 330 it can be disposed at a height above the height of the axle 130 relative to the ground 352.

Although longitudinal movement of the hitch 202 is restricted during use, rotation of the hitch 202 relative to the post 230 is unencumbered. Since the receiver 332 is releasably connected to the hitch 202, the receiver 332, and thus the device 330, are permitted to move about the central axis 248 of the post 230 via rotation of the hitch 202 about the post 230. This is desirable as it allows the device 330 to turn without imparting undue stress upon the post 230 while making turning easier. This is accomplished while still maintaining the ability of the tubular member 208 of the hitch 202 to pull the aerating device 10 as the device 330 moves.

FIGS. 9-10 illustrate one example of retraction device 270 that can be used to facilitate transport of the aeration device 10, as well as to engage and disengage the tine assemblies 138 and thus the tines 158 with the ground 352. A retraction device 270 may be secured to each side 26, 28 of the frame 20 in accordance with the present invention. Although the retraction devices 270 are shown to be secured to the outside of each side 26, 28, the retraction devices 270 could likewise be secured to the inside of each side 26, 28, and thus between the sides 26, 28 and/or within the inner region 30 of the frame 20.

Each retraction device 270 includes a linkage that provides means for engaging or disengaging the tines. As illustrated, the linkage of the retraction device 270 includes a plurality of links; namely, a first link 272, a second link 286, and a third link 310. The first link 272, the second link 286, and the third link 310 are generally rectangular in nature and are constructed of metal. The first link 272 includes a proximal end 274 and a distal end 276. The proximal end 274 includes an opening that is sized to accommodate the axle 130 bearing the tine assemblies 138. The distal end 276 of the first link 272 includes an opening that is sized to accommodate an axle 282 for a wheel 280. The axle 282 is rotatably mounted on the wheel 280 and will facilitate movement of the device 10 across the ground 352. This movement of the device 10 can be performed with or without supporting an operator, such as to transport the device 10 prior to the start of aeration or after completing aeration.

The second link 286 also includes a proximal end 288 and a distal end 290. The proximal end 288 of the second link 286 includes an opening that is sized to receive a fastener 320. The fastener 320 is used to secure the second link 286 to the side 26 of the frame 20 at the aperture 38 in the side 26. Although the fastener 320 secures the second link 286 to the side 26, the second link 286 is capable of pivoting relative to the side 26 about the fastener 320. The distal end 290 of the second link 286 includes an opening that is sized to receive a fastener 284. The fastener 284 can be used in combination with nuts to secure the second link 286 to the third link 310. Although the fastener 284 secures the second link 286 to the third link 310, the second link 286 is capable of pivoting relative to the third link 310 about the fastener 284.

The third link 310 also includes a proximal end 312 and a distal end 314. The proximal end 312 of the third link 310 includes an opening that is sized to receive the fastener 284 that connects the second link 286 to the third link 310. The distal end 314 of the third link 310 includes an opening that is sized to accommodate the axle 282 rotatably mounted on the wheel 280, similar to the first link 272.

The first link 272, the second link 286, and the third link 310 cooperate to move the wheel 280 associated with each respective side 26, 28 relative to the frame 20. Since the first link 272 is rotatably mounted about the axle 130, the second link 286 is rotatably mounted about the fastener 320, and the third link 310 couples the first link 272 to the second link 286, the wheel 280 is capable of moving in an arc about the axle 130 and the fastener 320 in the direction indicated at 'C'. This allows the wheel 280 to be moved closer or farther away from the frame 20.

As noted, an identical retraction device 270 can be rotatably mounted to the other side 28 of the frame 20. A handle 322 is used to connect the retraction device 270 on the side 26 to the retraction device 270 on the side 28. The handle 322 is an elongated member having curved ends which collectively exhibits a C-shape, although it may have different shapes. Each end of the handle 322 is welded or otherwise secured to the second link 286 of each retraction device 270. When the retraction device 270 is in the retracted position (FIG. 9), the handle 322 is disposed close to the distal end 24 of the frame 20 as well as the platform 70. The second link 286 and the third link 310 are substantially parallel to one another such that the second link 286 resists movement relative to the third link 310. This resistance keeps the third link 310, and thus the wheels 280, motionless, in the translational sense, in a position below the frame 20 such that transport of the device 10 is possible. In this position, the tines 158 are not engaged with the ground 352.

In order to overcome the resistance of the wheel 280 to translational movement, the handle 322 is used to alter the angle between the second link 286 and the third link 310. Due to the rigid coupling between the handle 322 and the second link 286 of each retraction device 270, movement of the handle 322 in the direction indicated at 'D' imparts a moment on the second link 286 of each retraction device 270 about the fastener 320. The placement of the handle 322 on the second link 286 causes the distal end 290 of the second link 286 and the proximal end 312 of the third link 310 to move in a direction away from the first link 272. This likewise causes the distal end 314 of the third link 310, and thus the wheel 280 coupled to it, to pivot about the axle 130 towards the frame 20 in the direction indicated at 'C'. A tension spring 296 may be secured between each side 26, 28 of the frame 20 and each second link 286, respectively, to assist the movement of the wheel 280 caused by the movement of the handle 322. This movement of the wheel 280 continues until the handle 322 resides on the opposing side of the aperture 38 on the frame 20. In this configuration, the first link 272, the second link 286, and the third link 310 are oriented in a substantially triangular pattern relative to the frame 20 (FIG. 12B). The ability of the handle 322 to control the location of the wheels 280 relative to the frame 20 facilitates both the use and transport of the device 10.

The axle 130 having the tine assemblies 138 secured thereto can be installed within the frame 20 (see FIG. 3). The proximal end 132 of the axle 130 can be inserted through the opening 32 in the side 26, and the distal end 134 of the axle 130 is inserted through the opening 32 in the side 28. When the axle 130 is installed, the proximal end 132 of the axle 130 extends through and beyond the side 26 of the frame 20, while the distal end 134 of the axle 130 extends through and beyond the other side 28 of the frame 20. This places the tine assemblies 138 between the sides 26, 28 of the frame 20. Although the axle 130 is depicted as being disposed in the openings 32 in the sides 26, 28 respectively, it should be understood that the axle 130 could attached at alternative locations along, above, or below the frame 20 relative to the ground 352 such that the axle 130 extends between the sides 26, 28.

If reinforcements 46 are used, the axle 130 further extends through the opening 48 in each adjacent pair of reinforcements 46. (see also FIG. 1). Although it is shown that there are two tine assemblies 138 disposed between each reinforcement 46, it will be understood that there could be more or less tine assemblies 138 between reinforcements 46. Furthermore, it will be understood that an unequal number of tine assemblies 138 may be disposed between reinforcements 46. A cover (not shown) may be secured to the top surface 31 of the frame 20 to cover the tines 158 once the axle 130 has been installed within the frame 20.

One or more additional wheels 360 may be secured to the platform 70 to provide support and stability for the operator 350 (see FIG. 3). The wheel may comprise a single or double wheel that is attached to the platform 70 between the first and second platform portions 72 and 90 via screws or the like. The wheel 360 may be a standard wheel rotatable about an axle or a caster wheel. The additional wheel 360 could be located between the operator's feet, or alternatively on the outside of the operator's feet closer to one of the wheels 280 on the retraction device 270. The additional wheel can facilitate movement of the device 10 during transport. If desired, the additional wheel may be oriented such that it is in use during operation of the device 10. That is, although the wheels 280 on the retraction devices 270 are retracted such that they do not contact the ground 352 during aerating, the additional wheel 360 may remain in contact with the ground 352. This would help maneuver the device 10 while turning or otherwise traveling over uneven terrain.

Figure 11:
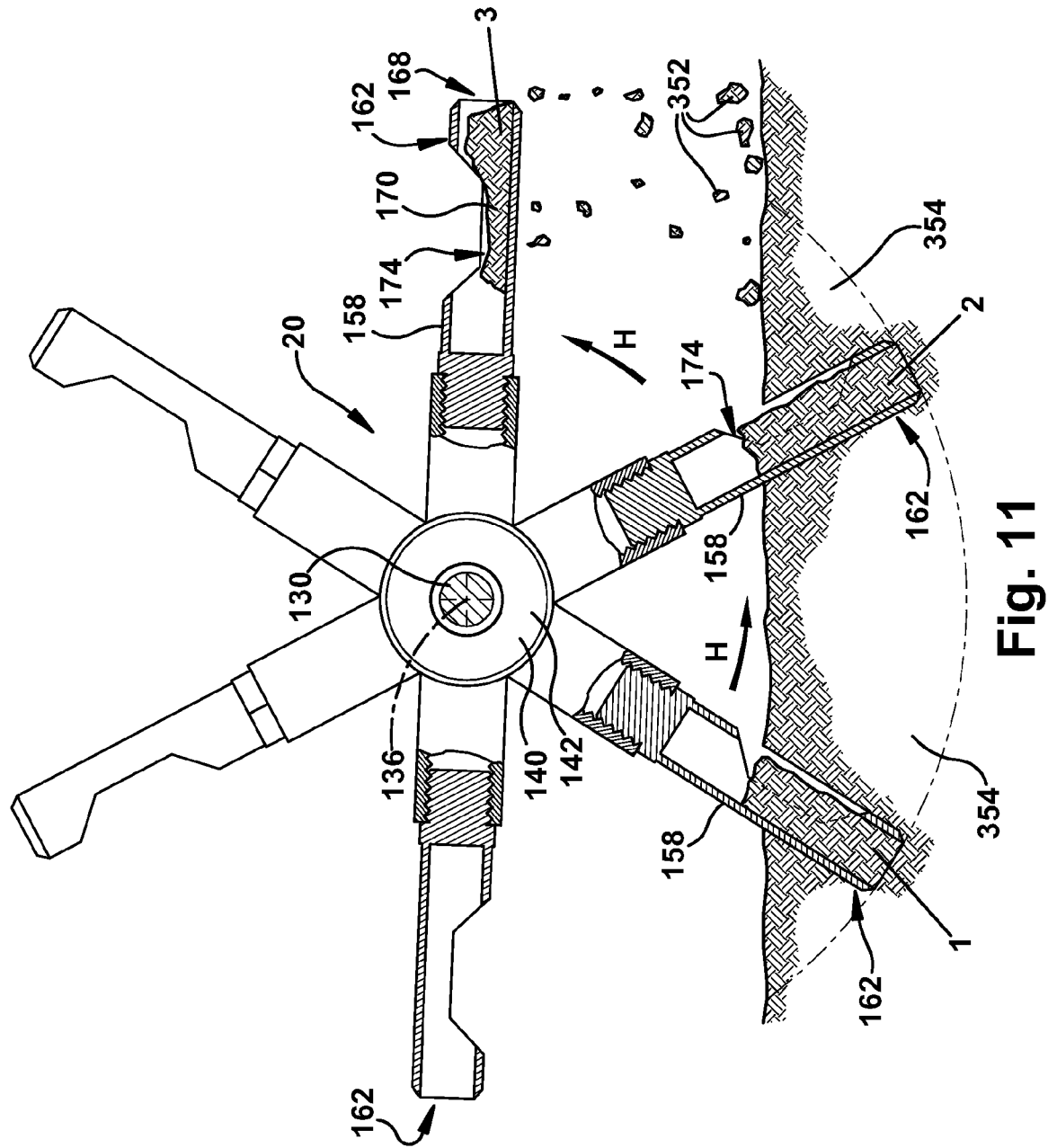
FIG. 11 is an enlarged view of the tine assembly of FIG. 4 while the aerating device is pulled over the ground with an operator disposed thereon.

After the attachment mechanism 200 has been attached to the self-propelled device 330, the device 10 is ready for use. Examples of operation of the device 10 are depicted in FIGS. 10-11, and includes utilizing means for selectively engaging and disengaging the at least one tine assembly 138 for aeration. The first of these means can include the retraction devices 270. First, the handle 322 is pulled up toward the operator 350 in the direction D (see FIGS. 9-10). This causes the wheel 280 on each retraction device 270 to move about the fastener 320 and the axle 130 in the manner described above from a first position in which the tine assemblies 138 are disengaged to a second position in which the tine assemblies 138 are engaged for aeration. This second position may place the wheels 280 in roughly the same plane as the frame 20. This second position of the wheels 280 causes the weight of the frame 20 to be taken off the wheels 280 and born by some of the tines 158. Although the tine assemblies 138 can rotate with the axle 130 relative to the frame 20, the configuration of the tine assemblies 138 ensures that at least some tines 158 will be disposed below the frame 20 regardless of the angle of rotation imparted upon the axle 130. With the wheels 280 moved up, those tines 158 are the part of the device 10 closest to the ground 352, and thus the only portion of the device 10 able to transfer the weight of the device 10 to the ground 352. The weight of the frame 20 causes these tines 158 to move downward to engage and penetrate the ground 352, as indicated at 'E'. (FIG. 10).

The operator 350 stands on the platform 70 (if not already on the platform) when the tines 158 are engaged with the ground 352, indicated at 'F'. This may include placing one foot on each portion 72, 90 of the platform 70 or both feet on the single platform 70, depending on the configuration of the device 10. In either case, the weight of the operator 350 is imparted to the frame 20 and thus to the axle 130 bearing the tine assemblies 138. This causes additional penetration of the tines 158 into the ground 352. Additional weight may be attached to the frame 20 (not shown) if additional penetration of the ground 352 by the tines 158 is desired beyond that which is provided by the weight of the frame 20 and the weight of the operator 350. The weight could also be secured between tine assemblies 138 on the axle 130 or anywhere else on the axle 130, such as between tine assemblies 138. This may be desired if the ground 352 to be aerated is rather hard or otherwise resistant to penetration by the tines 158, or if the operator 350 is lightweight. Furthermore, a shock absorbing mechanism (not shown) may help secure the platform 70 to the frame 20. The shock absorbing mechanism may dampen the movement of the platform 70 and the frame 20 relative to the ground 352 as the device 10 is in use.

While in the engaged position, the operator 350 is able to stand on the platform 70 and grasp a portion of the self-propelled device 330 (e.g. a lawn mower), such as the steering mechanism (e.g., handles), for stability (see FIG. 1). As the device 330 moves in the direction indicated at 'G', the attachment of the frame 20 to the device 330 via the attachment mechanism 200 causes the frame 20 to move in the direction G with the device 330. Since the tines 158 are engaged with the ground 352, a moment is imparted upon the tines 158 when the frame 20 moves with the device 330. This moment causes the tines 158 to rotate counterclockwise about the axis 136 of the axle 130 in the manner indicated at 'H' in FIG. 16.

As shown in FIG. 11, as the tines 158 rotate in the direction H, the nature of the distal end 162 of the tines 158 (FIGS. 6-7) displaces the ground 352 and turns it over as it clears a path 354 through the ground 352. The path 354 is created as each tine 158 first contacts the ground 358 indicated generally at '1', subsequently cuts through the ground 352 to a second position indicated generally at '2', and finally exits the ground 352 at a third position indicated generally at '3'. The ground 352 is displaced by the distal end 162 of the tine 158. A portion of the ground 352 will enter the lateral opening 174 on the tine 158 and be forced out through the passage 170 and eventually the opening 168 at the distal end 162 of the tine 158. Since all tines 158 on each tine assembly 138 generally reside in the same plane, there is a continuous plugging of the ground 352 along the path 354 as the device 330 moves. The number of paths 354 created will depend on the number of tine assemblies 138 mounted on the axle 130. Such paths 354 will be substantially parallel to each other as the device 330 moves. The amount of ground 352 aerated is correlative with the number of tine assemblies 138 secured to the axle 130, the number of tines 158 on each individual tine assembly 138, and the speed of the device 330.

As shown in FIG. 10, each tine 158 rotates in the direction H through a first plane 362 and a second plane 364 spaced apart from the first plane 362. The first plane 362 intersects the point at which the distal end 162 of the tine 158 is farthest above the frame 20 relative to the ground 352. The second plane 364 intersects the point at which the distal end 162 of the tine 158 is farthest below the frame 20 relative to the ground 352. The first and second planes 362, 364 are substantially parallel with a third plane 366. The third plane 366 is substantially co-planar with the platform 70 and is located between the first plane 362 and the second plane 364.

The ability to move the wheels 280 relative to the frame 20 allows for improved stability and transport. When the entire area to be aerated is complete, the operator 350 can move the handle 322 back to its original position to cause the wheels 280 to move away from the frame 20 and towards the ground 35. Once the second link 286 and the third link 310 are again substantially parallel with one another the wheels 280 are locked in the extended position corresponding to the disengaged tine assembly 138 condition. This places the wheels 280 closer to the ground 352 than the tines 158, and thus the device 10 can be wheeled away for storage, etc.

Although it has been illustrated that the retraction devices 270 are used to extend and retract the wheels 280 in order to use the aerating device 10, it will be understood that alternative means may be utilized to transition the device 10 from a transporting position to a use position which may be the same or different from a mechanism to engage or disengage the tine assemblies 138. For example, the wheels 280 may be rigidly secured to the frame 20 such that they maintain the same position relative to the frame 20. In such a case, the axle 130 or other structure supporting the tine assemblies 138 disposed thereon can be configured to move in a plane substantially orthogonal to the top surface 31 of the frame 20. Such movement allows the tines 158 on the tine assemblies 138 to be moved from a position in which the wheels 280 are the portion of the device 10 nearest the ground 352 to a position in which the tines 158 are nearest the ground 352. That is, the axle 130 can be moved in an upward fashion relative to the frame 20 into a retracted position wherein the device 10 can be transported by rotating the wheels 280 without the tines 158 contacting the ground 352. When the device 10 is ready for use, the axle 130 can be moved in a downward fashion relative to the frame 20 into an extended position wherein the tines 158 engage the ground 352. This movement may be performed manually or through the use of motors, electronics, pistons, hydraulics, pneumatics, or the like.

Figure 12:
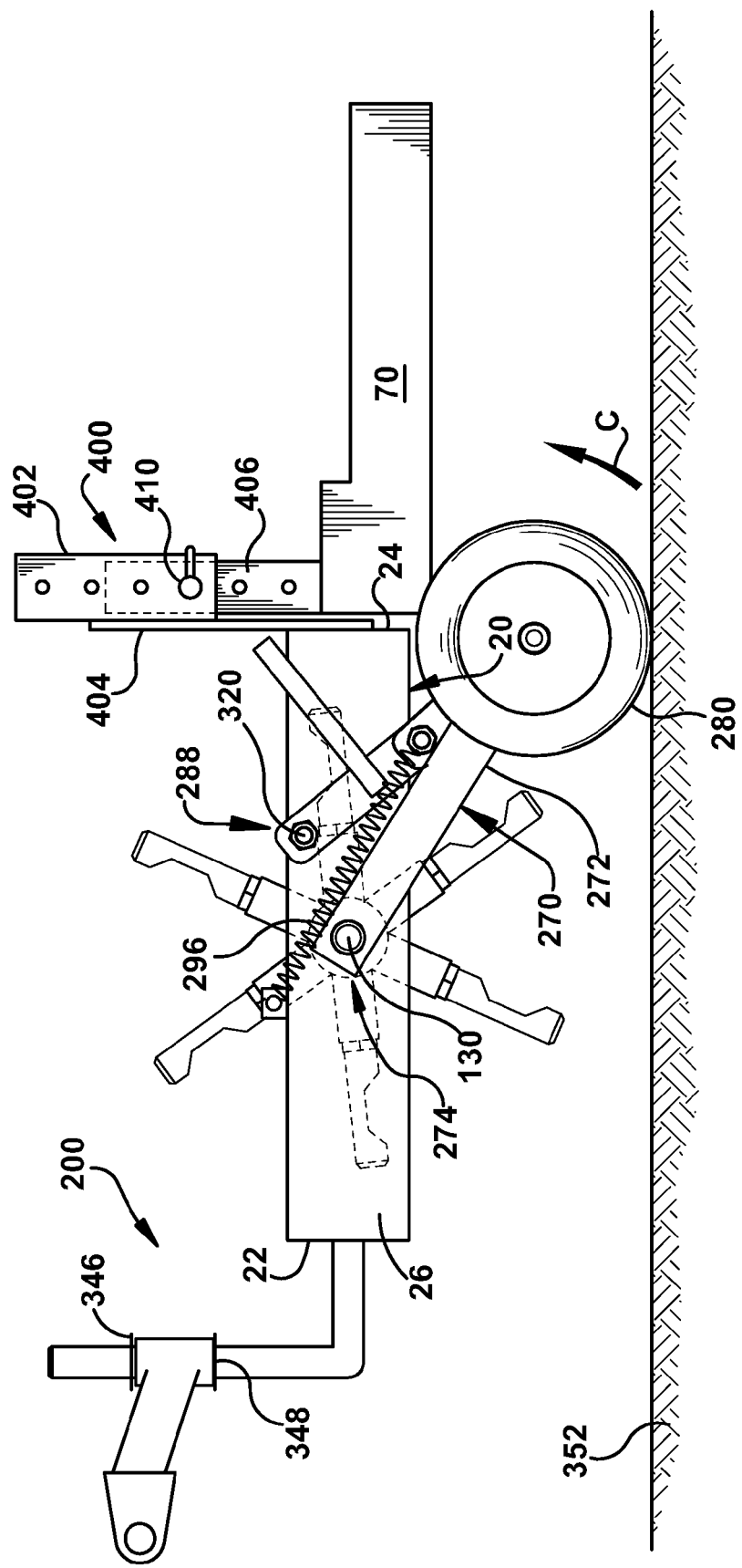
FIG. 12 is a side elevation of the aerating device depicting an adjustable platform according to an example embodiment of the invention.

In an alternative embodiment of the present invention the platform 70 can be movable relative to the frame 20, such as shown in FIG. 12. This allows the device to accommodate operators of varying height such that use of the device is not uncomfortable. To accomplish this, the end of the frame 20 opposite the attachment mechanism 200 may be configured with attachment means for adjustably connecting the platform 70 vertically relative to frame, indicated at 400. In the example of FIG. 12, the adjustable attachment means 400 includes an elongate rigid support 402 that extends at the distal end 24 along an orientation that is substantially transverse to the direction of movement for the aerating device. The rigid support 402 can be fixed to the distal end 24 of the frame, such as through a rigid plate 404 that extends above the frame to provide an additional elevated point of fixation for the support 402. The plate can be fixed to the frame 20, such as by welding or using appropriate fasteners. Alternatively, the support 402 could be connected directly to the frame 20 (e.g., by welding or by the use of fasteners). The rigid support 402 can be one or more hollow rod (e.g., formed of steel or other rigid metal) that is dimensioned and configured for receiving an elongate mating support 406 that extends from a proximal end of the platform 70. For instance, the frame support 402 can be located near the center of the distal end 24 of the frame 20 with the making support 406 located at a central location (between foot receiving portions) of the platform 70. Each of the supports 402 and 406 can include sets of spaced apart apertures that can align with each other for receiving a pin or other retaining features, indicated at 410, which can be inserted through aligned apertures of the respective supports to set the height of the platform 70 relative to the frame 20.

The configuration of the attachment means 400 thus enables the platform to be secured to the end of the frame at varying positions along the end of the platform. Therefore, the platform can be moved in an upward fashion relative to the frame if a shorter operator is using the device. Likewise, the platform 70 can be moved in a downward fashion relative to the frame if a taller operator is using the device. This movement changes the distance between the operator's feet on the platform and the steering mechanism or other portion of the device the operator grasps for stability during operation. This engagement also allows the platform to be easily adjusted to accommodate use by different operators.

Those skilled in the art may appreciate other means for adjustably connecting the platform to the frame, such as may include the use of threaded fasteners, springs, cams, or any other means capable of realeasably engaging the platform to an end of the frame. The engagement is configured such that the weight of the operator can be supported by the engagement between the attachment means on the end of the frame and the attachment means on the platform without plastic deformation to either.

Additionally, or alternatively, the platform 70 can be hingedly connected to the frame 20 so that the platform is moveable between an operating position in which the platform is substantially parallel with the direction of movement of the device 10 and a stored position in which the platform is substantially orthogonal to the direction of movement of the device. One or more latches or other retaining means (hooks, cords, pins) can be provided to hold the platform 70 in the stored, upright position. For example, the stored position can be used when operating the device on a steep slope or incline so that the operator can walk behind the device to facilitate maneuvering the self-propelled lawn device 330 and the apparatus 10.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, while the foregoing is described with respect to an aerating device, other lawn apparatuses can be utilized in place of tines in the various example embodiments shown and described herein, such as a slit seeder or a thatcher. In such alternative examples, additional wheels can be utilized (attached to the frame and/or platform) to inhibit penetration of the slit seeder or thatcher (e.g., blades thereof) into the ground beyond a predetermined amount regardless of the weight on the platform or frame. In certain embodiments such split seeder or thatcher can be interchangeable with the tine assembly to enable multiple uses of the frame and platform shown and described herein. Accordingly, the present invention is intended to embrace all such alterations, modifications and variations that fall within the spirit and scope of the appended claims.

What is claimed is:

1. A combination of an aerating device attached to a self-propelled lawnmower, the combination comprising:
   the self-propelled lawnmower comprising:

a receiver extending outwardly from a back end of the self-propelled lawnmower; and a pair of handles extending upwardly and rearwardly from the self-propelled lawnmower on opposing sides of the receiver for steering for the self-propelled lawnmower;

the aerating device comprising;

a frame having a proximal end, a distal end, and a pair of sides extending between the proximal and distal ends;

an axle mounted extending laterally between the sides of the frame;

at least one tine assembly mounted for rotation about a tine axis extending longitudinally through the axle, the tine assembly having a tine diameter;

an attachment mechanism secured to the proximal end of the frame and attached to the receiver of the self-propelled lawnmower as to permit rotation of aerating device relative to the self-propelled lawnmower about an axis that extends through the receiver and is substantially transverse to a direction of travel of the self-propelled lawnmower; and a platform secured to the distal end of the frame opposite the attachment mechanism for supporting an operator behind the at least one tine assembly to facilitate gripping the handles of the self-propelled lawnmower, the platform extending outwardly from the frame at an elevation that resides between vertical extents of the tine diameter, whereby weight of an operator on the platform causes rotational force of the aerating device about the axis so that tines closest to the ground transfer the weight of the operator to the ground for penetration of such closest tines into the ground for performing aeration in the direction of travel of the self-propelled lawnmower.

2. The combination of claim 1, wherein the axle and the platform of the aerating device lie in substantially the same plane.

3. The combination of claim 1, further comprising means for selectively engaging and disengaging the at least one tine assembly for aeration.

4. The combination of claim 3, wherein the means for selectively engaging and disengaging the at least one tine assembly comprises at least one wheel, the at least one wheel is movable relative to the frame from a first position below the frame in which the at least one tine assembly is disengaged to prevent penetration of the tines into the ground, to a second position in which the at least one tine assembly is engaged to provide for penetration of tines into the ground during aeration.

5. The combination of claim 3, wherein when the tines are engaged for aeration, the tines closest to the ground are about the only portion of the aerating device able to transfer the weight to the ground, thereby causing the tines to engage and penetrate the ground for aeration in the direction of travel of the self-propelled lawnmower.

6. The combination of claim 3, wherein the attachment mechanism of the aerating device further comprises:

a post secured to one of the proximal end or the distal end of the frame opposite the platform; and a hitch comprising a tubular portion, an arm, and a forked member, wherein the tubular portion is slidably mounted on the post and the forked member is releasably attached to receiver of the lawnmower.

7. The combination of claim 6, wherein a position of the hitch is variable along the post.

8. The combination of claim 6, wherein the hitch is disposed at a height above the height of the axle relative to the ground.

9. The combination of claim 6, wherein the hitch is movable about at least two axes relative to the post.

10. The combination of claim 1, wherein the at least one tine assembly comprises a hub having a plurality of projections extending radially therefrom, a tine extends radially from each of the plurality of projections.

11. The combination of claim 10, wherein each tine is one of releasably engageable with each projection or permanently attached to each projection.

12. The combination of claim 1, wherein the at least one tine assembly comprises a plurality of tines coupled to the axle, the tines rotating through first and second spaced apart planes that define the vertical extents of the tine diameter are substantially parallel with a third plane, the third plane being substantially co-planar with the platform and being located between the first and second plane.

13. The combination of claim 1, further comprising an adjustable attachment for connecting the platform adjustable relative to the frame at a plurality of selectable heights between the vertical extents of the tine diameter.

14. The combination of claim 1, wherein the at least one tine assembly comprises a plurality of tine assemblies, each of the plurality of tine assemblies being freely rotatable about the tine axis to aerate the ground.

15. The combination of claim 14, wherein the plurality of tine assemblies are spaced apart along the axle a distance that at least approximates a wheel base of the lawnmower.

16. The combination of claim 1, further comprising at least one wheel secured to the platform to provide support and stability for the operator on the platform.

17. A combination of an aerating device attached to a self-propelled lawnmower, the combination comprising:

the self-propelled lawnmower comprising a pair of handles extending upwardly and rearwardly from a body of the self-propelled lawnmower for steering for the self-propelled lawnmower; and the aerating device comprising:

a frame having a proximal end, a distal end, and a pair of sides extending between the proximal and distal ends;

a plurality of tine assemblies mounted for rotation about a tine axis extending through the pair of sides of the frame, each of the plurality of tine assemblies comprising a plurality of tines configured to rotate about the tine axis through first and second spaced apart planes;

an attachment mechanism secured to the proximal end of the frame and attached to a back end of the self-propelled lawnmower as to permit free rotation of aerating device relative to the self-propelled lawnmower about a fulcrum axis that extends laterally through the attachment mechanism between the proximal end of the frame and the self-propelled lawnmower substantially transverse to a direction of travel of the self-propelled lawnmower; and a platform secured to distal end of the frame opposite the attachment mechanism for supporting an operator behind the tine assemblies to facilitate gripping the handles of the self-propelled lawnmower, the platform extending outwardly from the frame at an elevation that resides in a third plane that is substantially parallel with and located between the first and second planes, wherein weight of an operator on the platform causes rotation of the aerating device about the fulcrum axis;

a retraction device that is configured to selectively engage and disengage the tines for performing and terminating aeration, such that, when the tines are engaged, the rotation of the aerating device about the fulcrum axis causes tines closest to the ground to transfer the weight of the operator to the ground for penetration of the closest tines into the ground for performing aeration in the direction of travel of the self-propelled lawnmower.

18. The combination of claim 17, further comprising an adjustable attachment for connecting the platform relative to the frame at a plurality of selectable heights between the first and second planes.

19. The combination of claim 17, wherein the self-propelled lawnmower further comprises a receiver at a back end of the self-propelled lawnmower; and
wherein the attachment mechanism is configured to mating attachment with the receiver of the self-propelled lawnmower to provide for the rotation about the fulcrum axis, the attachment mechanism further comprising:
 a post secured to one of the proximal end or the distal end of the frame opposite the platform; and
 a hitch comprising a tubular portion, an arm, and a forked member, wherein the tubular portion is slidably mounted on the post and the forked member is releasably attached to receiver of the lawnmower.

20. The combination of claim 19, wherein the hitch is movable about at least two axes relative to the post.

* * * * *